(12) United States Patent
Guo et al.

(10) Patent No.: US 12,398,073 B2
(45) Date of Patent: Aug. 26, 2025

(54) HIERARCHICAL ORGANIC-INORGANIC COMPOSITES SYNTHESIZED BY ELECTROSPINNING FIBERS WITHIN A NON-CONDUCTIVE AND A CONDUCTIVE PRE-CERAMIC GEL

(71) Applicant: Northwestern University, Evanston, IL (US)

(72) Inventors: Ping Guo, Northfield, IL (US); Ange-Therese Akono, Evanston, IL (US); Yunzhi Xu, Evanston, IL (US)

(73) Assignee: Northwestern University, Evanston, IL (US)

( * ) Notice: Subject to any disclaimer, the term of this patent is extended or adjusted under 35 U.S.C. 154(b) by 1014 days.

(21) Appl. No.: 17/477,892

(22) Filed: Sep. 17, 2021

(65) Prior Publication Data

US 2022/0089496 A1 Mar. 24, 2022

Related U.S. Application Data

(60) Provisional application No. 63/080,523, filed on Sep. 18, 2020.

(51) Int. Cl.
*C04B 28/00* (2006.01)
*C04B 16/06* (2006.01)
*D01D 5/00* (2006.01)
*D01F 6/18* (2006.01)

(52) U.S. Cl.
CPC ........ *C04B 28/008* (2013.01); *C04B 16/0658* (2013.01); *D01D 5/003* (2013.01); *D01F 6/18* (2013.01)

(58) Field of Classification Search
CPC . C04B 28/008; C04B 16/0658; C04B 28/006; C04B 12/04; C04B 14/106; D01D 5/003; D01D 5/0046; D01F 6/18; D01F 6/16; D01F 6/26; Y02P 40/10
See application file for complete search history.

(56) References Cited

U.S. PATENT DOCUMENTS

2011/0262518 A1 10/2011 Smyth et al.

OTHER PUBLICATIONS

Y. Xu et al. "Fabrication of Fiber-Reinforced Polymer Ceramic Composites by Wet Electrospinning," *Manufacturing Letters* (2021), Doi: https://doi.org/10.1016/j.mfglet.2021.07.017.
Hui Wang et al., "Aligned wet-electrospun starch fiber mats," *Food Hydrocolloids* (2019); pp. 113-117.
Larissa M. Shepherd et al., "Immersion Electrospinning as a New Method to Direct Fiber Deposition," *Macromol. Mater. Eng.* 2017, vol. 302; pp. 1700148 (1 of 5).

(Continued)

*Primary Examiner* — Angela C Scott
(74) *Attorney, Agent, or Firm* — Bell & Manning, LLC

(57) ABSTRACT

Methods for the production of ceramic composites in which three-dimensional (3D) printed organic polymer fibers are embedded in an amorphous inorganic ceramic matrix are provided. The composites are made by electrospinning the organic polymer fibers and collecting them in a liquid or gel collector. Ceramic precursors added to the liquid collector after the fibers are collected, or present in the gel collector during the electrospinning, are then cured to form a solid ceramic matrix around the organic polymer fibers to produce an organic polymer fiber-reinforced ceramic.

18 Claims, 17 Drawing Sheets

(56) References Cited

OTHER PUBLICATIONS

Xushan Wang et al., "Preparation of Polymeric nanofibers via immersion electrospinning," *European Polymer Journal* (2020), vol. 134; pp. 109837 (1 of 8).

Thomas J. Hinton et al., "3D Printing PDMS Elastomer in a Hydrophilic Support Bath via Freeform Reversible Embedding," *ACS Biomaterials Science Engineering* 2016, vol. 2; pp. 1781-1786.

Yingying Zheng et al., "Uniform nanoparticle coating of cellulose fibers during wet electrospinning," *Journal of Materials Chemistry A*, Jun. 2014; pp. 1-16.

Agueda Sonseca et al., "Architectured helically coiled scaffolds from elastomeric poly (butylene succinate) (PBS) copolyester via wet electrospinning," *Materials Science and Engineering: C*, Mar. 2020, vol. 108; pp. 110505 (1-11).

Yujie Chen et al., "Advanced fabrication for electrospun three-dimensional nanofiber aerogels and scaffolds," *Bioactive Materials* (2020), vol. 5; pp. 963-979.

Seeram Ramakrishna et al., "Multi-functional electrospun nanofibres for advances in tissue regeneration, energy conversion & storage, and water treatment," *Chemical Society Reviews* (Dec. 14, 2015; pp. 1-17.

Teo, Wee-Eong, et al. "A dynamic liquid support system for continuous electrospun yarn fabrication," *Polymer* (2007), vol. 48, No. 12; pp. 3400-3405.

Taskin, Mehmet Berat, et al. "Three-dimensional polydopamine functionalized coiled microfibrous scaffolds enhance human mesenchymal stem cells colonization and mild myofibroblastic differentiation," *ACS applied materials & interfaces* (2016), vol. 8, pp. 15864-15873.

Ran, Jiabing, et al. "Constructing multi-component organic/inorganic composite bacterial cellulose-gelatin/hydroxyapatite double-network scaffold platform for stem cell-mediated bone tissue engineering," *Materials Science and Engineering: C* (2017), vol. 78; pp. 130-140.

Liao, Huaqiang, et al. "Aligned electrospun cellulose fibers reinforced epoxy resin composite films with high visible light transmittance," Cellulose (2012), vol. 19; pp. 111-119.

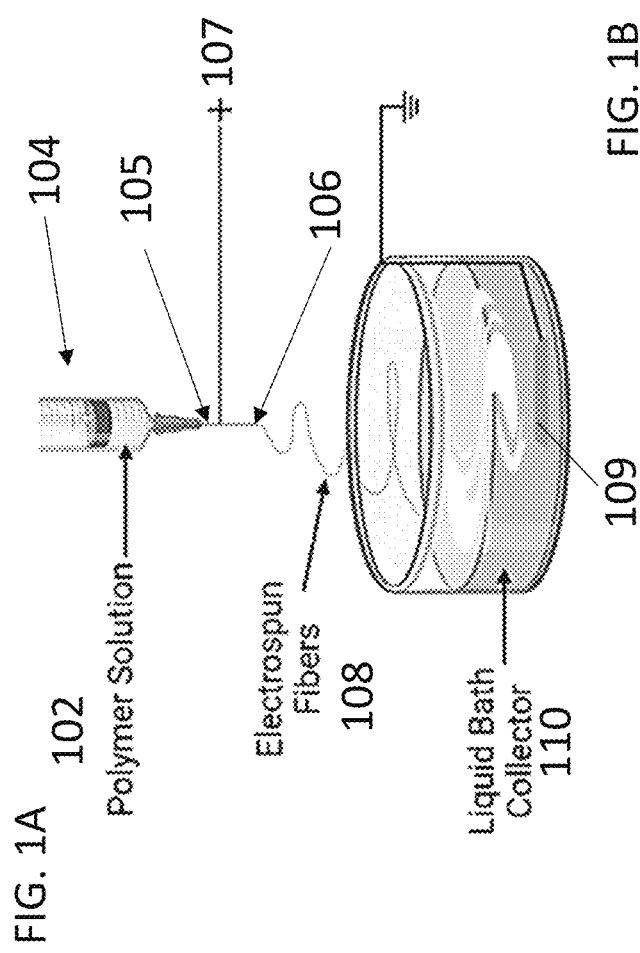
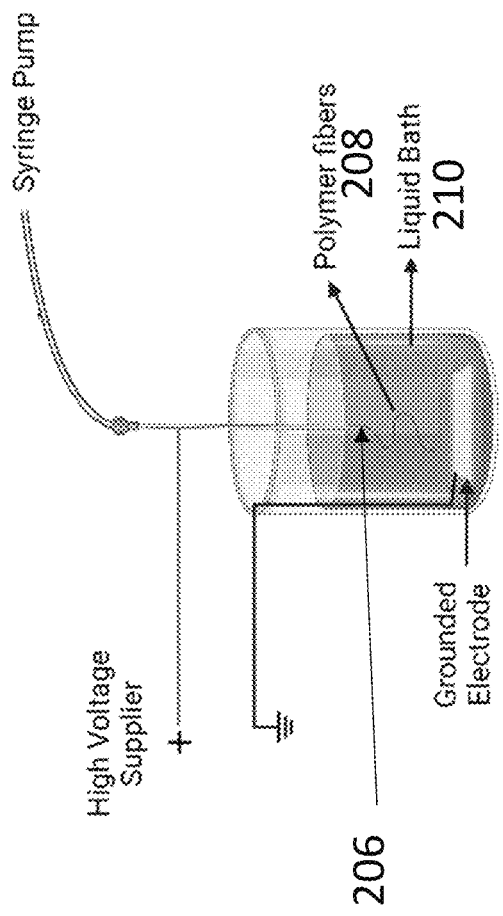
FIG. 1A
FIG. 1B

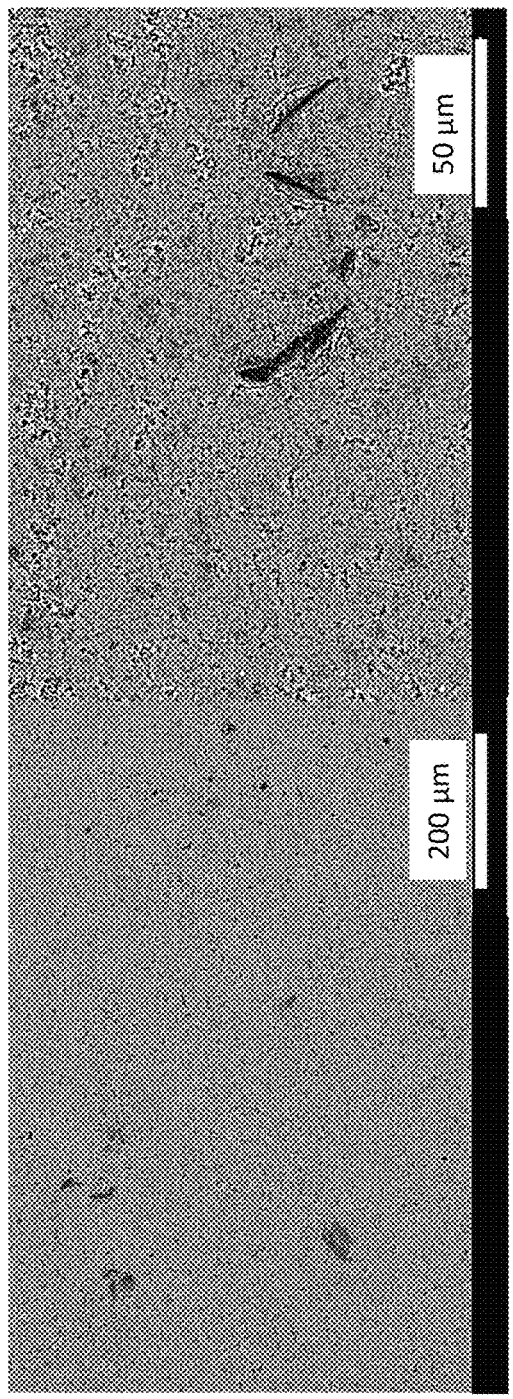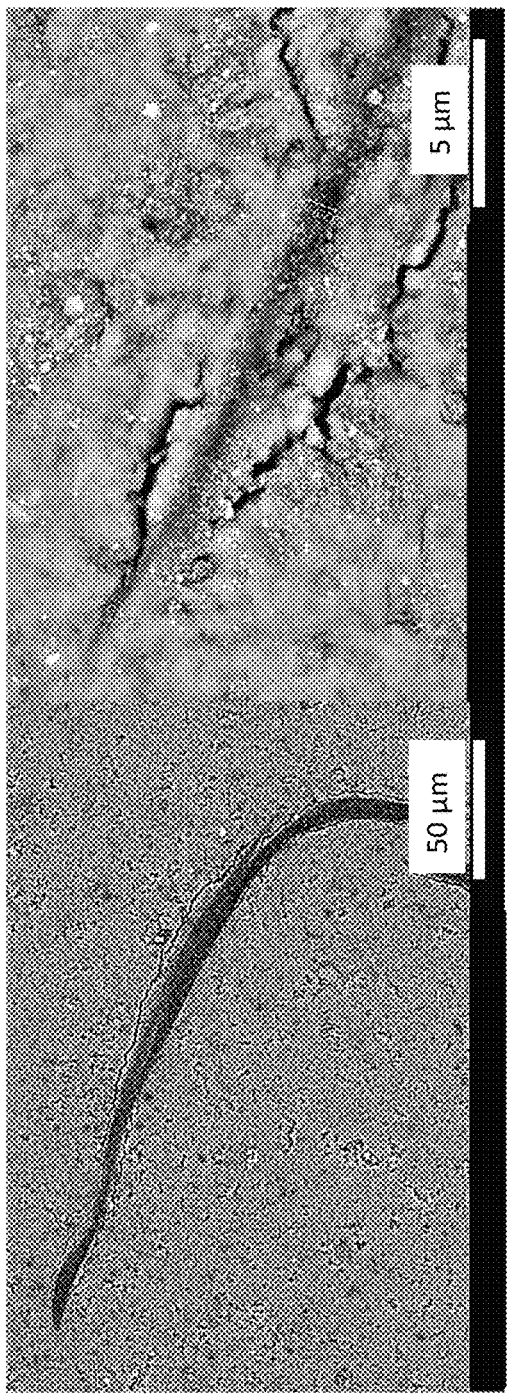
FIG. 3A FIG. 3B FIG. 3C FIG. 3D

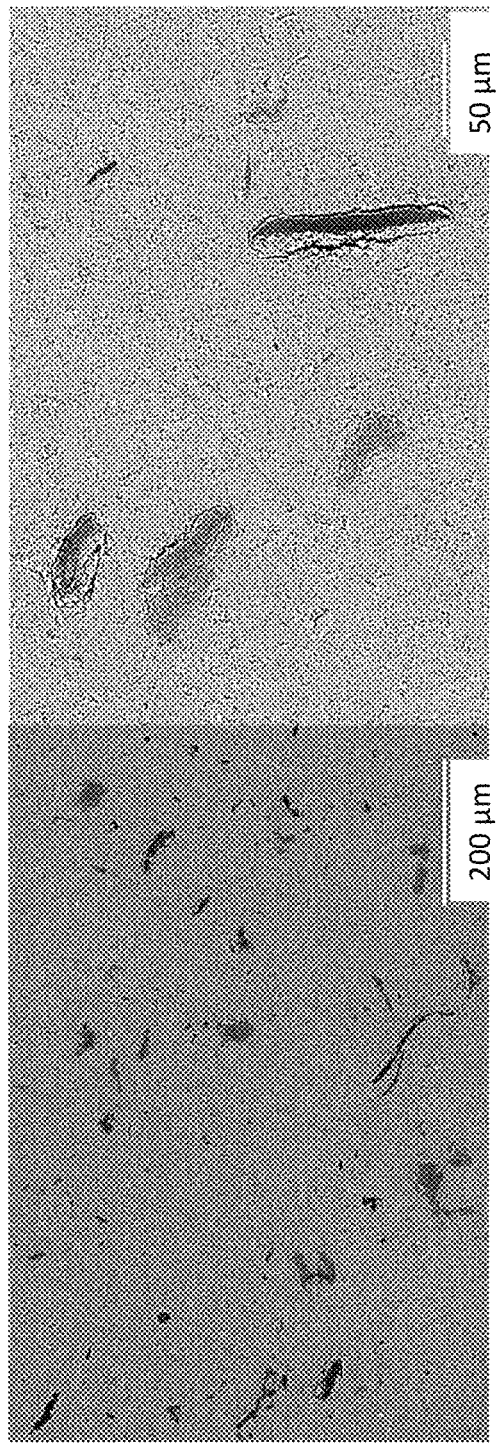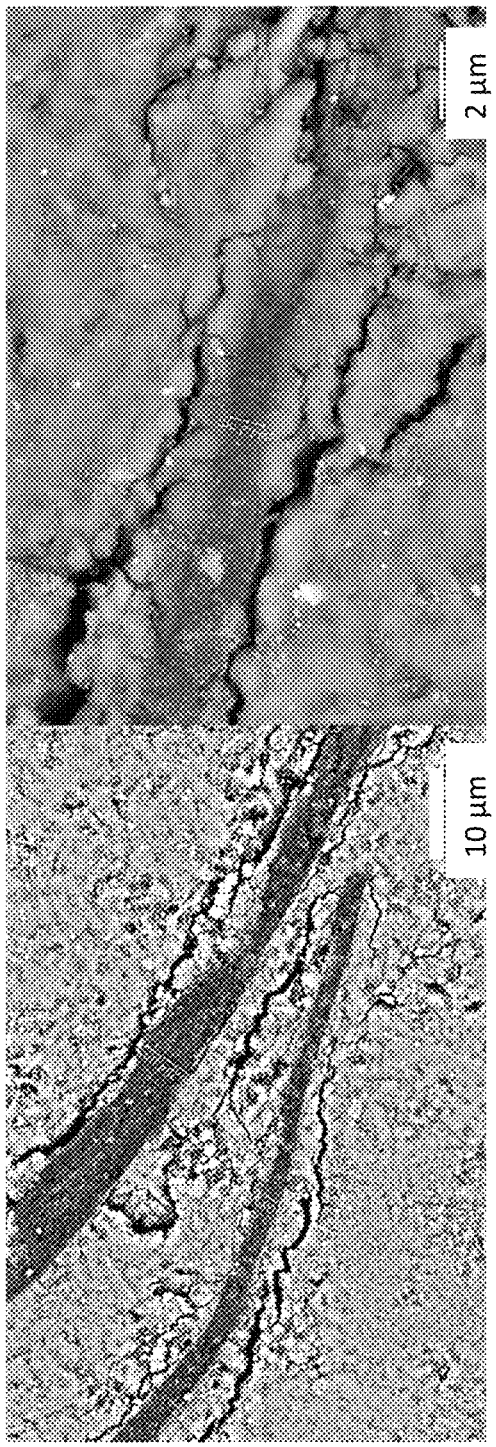
FIG. 4A  FIG. 4B  FIG. 4C  FIG. 4D

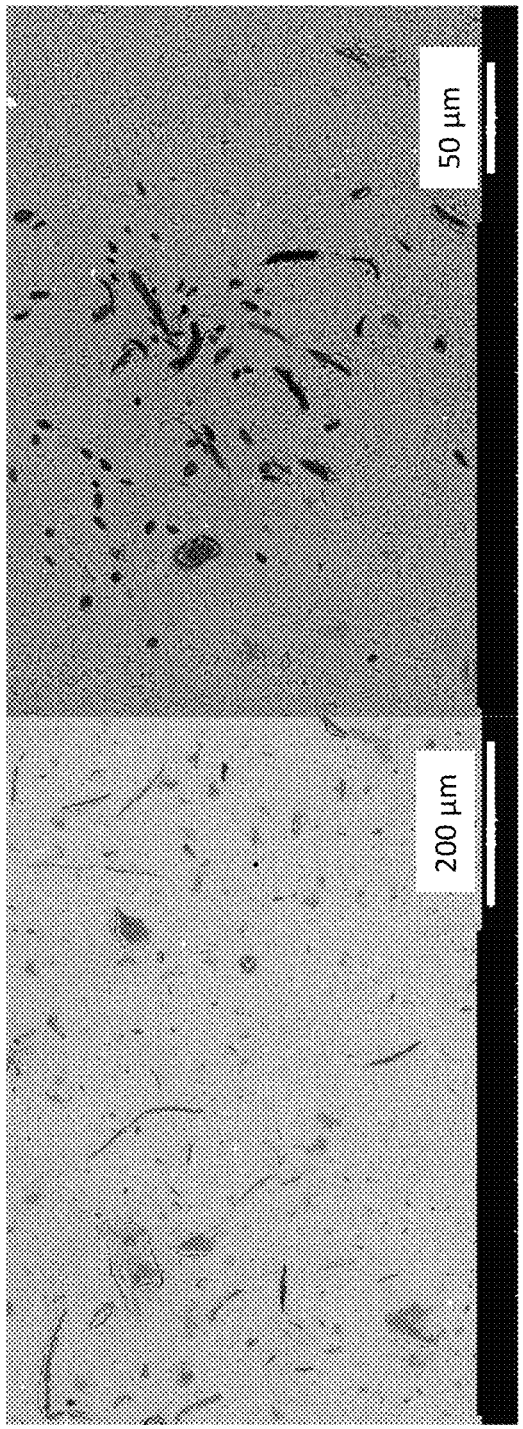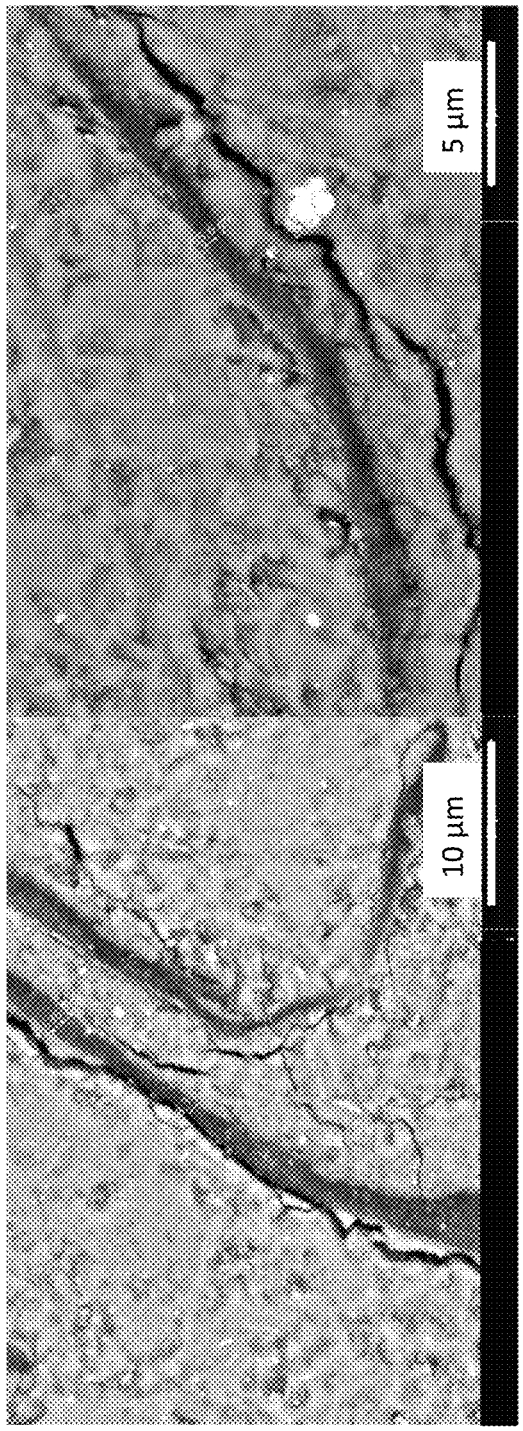
FIG. 5A  FIG. 5B  FIG. 5C  FIG. 5D

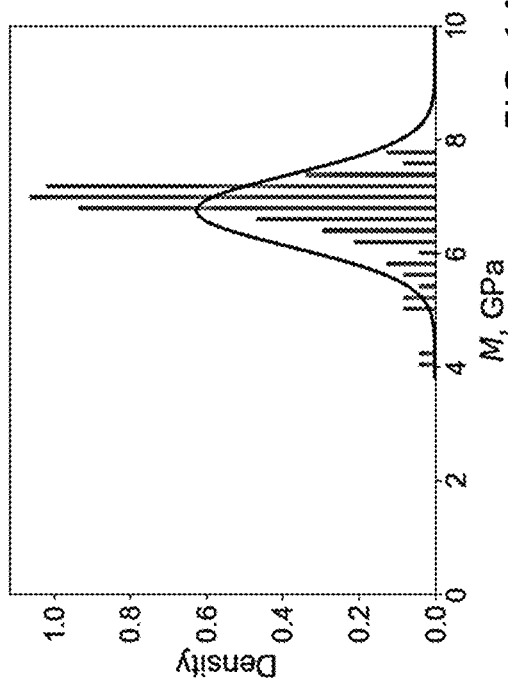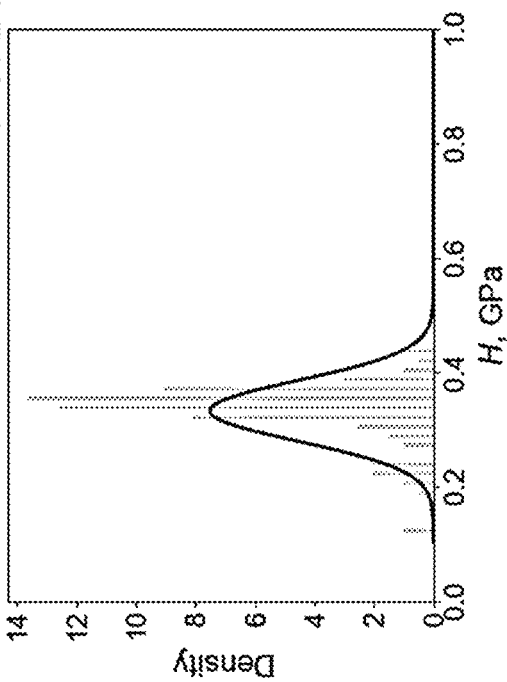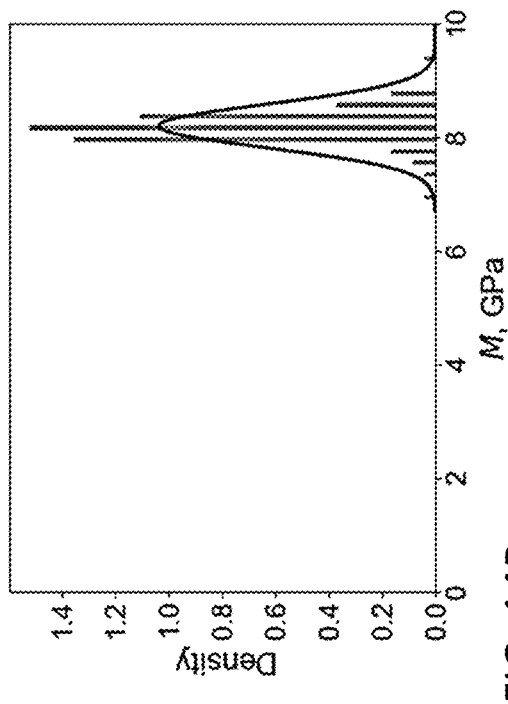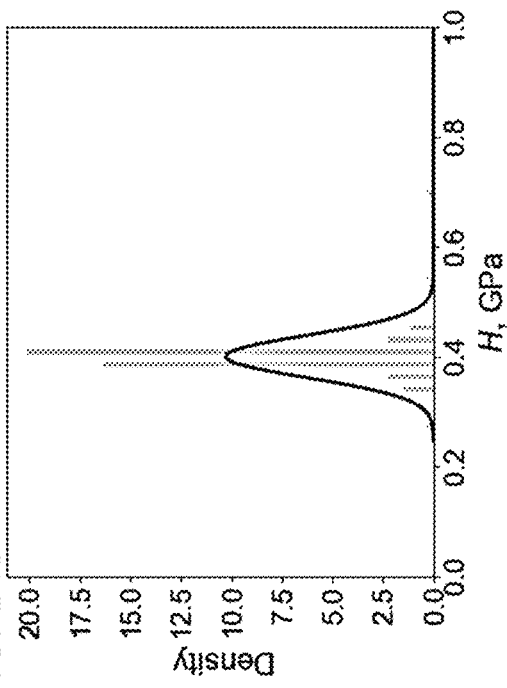

HIERARCHICAL ORGANIC-INORGANIC COMPOSITES SYNTHESIZED BY ELECTROSPINNING FIBERS WITHIN A NON-CONDUCTIVE AND A CONDUCTIVE PRE-CERAMIC GEL

CROSS-REFERENCE TO RELATED APPLICATIONS

The present application claims priority to U.S. provisional patent application No. 63/080,523 that was filed Sep. 18, 2020, the entire contents of which are incorporated herein by reference.

REFERENCE TO GOVERNMENT RIGHTS

This invention was made with government support under 70NANB19H005 awarded by the National Institute of Standards and Technology and under 1829101 and 1928702 by the National Science Foundation. The government has certain rights in the invention.

BACKGROUND

Electrospinning is a versatile and efficient approach for generating micro- and nano-fibers with extremely high aspect ratios and surface areas. The intrinsic wavy and spiral characteristics of electrospun fibers provide desirable attributes for toughening ceramic matrices. In traditional electrospinning, the fibers are usually collected as a non-woven mat using solid collectors. However, the adoption of a liquid bath collector has been exploited for the purpose of expediting the coagulation of fibers or obtaining fibers with specific structures. (Zheng, Y. et al., (2014). *Journal of Materials Chemistry A,* 2(36), 15029-15034; Teo, W. E. et al., (2007). *Polymer,* 48(12), 3400-3405.) Using electrospun fibers as nanoadditives has also been explored, primarily in polymer-based composites through film-stacking or solution impregnation. (Xu, S. et al., (2016). Journal of Biomedical Materials Research Part B: Applied Biomaterials, 104(3), 640-656; Liao, H. et al., (2012). Cellulose, 19(1), 111-119.) Short electrospun fiber reinforcement has been attempted through mechanical cutting or ultrasonication of electrospun non-wovens. (Jiang, S. et al., (2013). Composites science and technology, 88, 57-61; Sawawi, M. et al., (2013). Polymer, 54(16), 4237-4252.) These methods have not given full scope to the advantages of electrospun fibers. The compact nature of the non-woven mat obtained from traditional electrospinning substantially diminishes the flexibility of electrospun fibers, and the fibers cannot be effectively dispersed inside the matrix. Meanwhile, the short electrospun fiber generation raises strict requirements in experiment devices and protocols and sometimes yields limited dispersibility. (Sawawi, M. et al., 2013.)

Wet-electrospinning, which adopts a liquid bath collector instead of a solid metal collector, has been used for tissue engineering applications. For example, Taskin et al. has produced three-dimensional (3D) microfibrous scaffolds using a grounded ethanol collector and demonstrated the advantages of the loosely packed fibrous structures in mimicking extracellular matrix, compared to conventional two-dimensional (2D) electrospun nonwovens. (Taskin, M. B., et al., (2016). *ACS applied materials & interfaces,* 8(25), 15864-15873.) Despite its application in tissue engineering, wet-electrospinning has not been explored in composite manufacturing. (Peng, S., et al., (2016). Chemical Society Reviews, 45(5), 1225-1241.)

SUMMARY

Methods for the production of ceramic composites in which three-dimensional printed organic polymer fibers are embedded in an amorphous inorganic matrix are provided.

One example of a method of making a fiber-reinforced ceramic includes the steps of: electrospinning a water-insoluble organic polymer fiber; collecting the electrospun water-insoluble organic polymer fiber in a collector, wherein the collector is a liquid or gel, to disperse the electrospun water-insoluble organic polymer fiber in the collector; adding inorganic ceramic precursors to the collector, wherein the inorganic ceramic precursors are added to the collector before, during, or after collecting the electrospun water-insoluble organic polymer fiber in the collector; adding an inorganic curing agent into the collector; and curing the inorganic ceramic precursors and the curing agent to form an organic polymer fiber-reinforced ceramic.

Another example of a method of making a fiber-reinforced ceramic includes the steps of: electrospinning a water-soluble organic polymer fiber; collecting the electrospun water-soluble organic polymer fiber in a gel collector comprising inorganic ceramic precursors to disperse the electrospun water-soluble organic polymer fiber in the gel collector, wherein the water-soluble organic polymer fiber is not a polyethylene oxide fiber; adding an inorganic curing agent into the gel collector; and curing the inorganic ceramic precursors and the inorganic curing agent to form an organic polymer fiber-reinforced ceramic.

Other principal features and advantages of the invention will become apparent to those skilled in the art upon review of the following drawings, the detailed description, and the appended claims.

BRIEF DESCRIPTION OF THE DRAWINGS

FIG. 1A shows a schematic of the wet-electrospinning set-up used in Example 2. The liquid bath collector was varied between deionized (DI) water and waterglass in that example. FIG. 1B shows a schematic of a set-up for I-EHD, as described in Example 3.

FIGS. 3A-3D show scanning electron microscope (SEM) images of the microstructure of a potassium geopolymer reinforced with polyacrylonitrile fibers, with a fiber loading of 0.1 weight percent (wt %) (KGP-0.1 wt %-PAN). The darker phase represents the PAN fibers. FIGS. 3A-3B show microstructure. FIGS. 3C-3D show individual fibers in the matrix.

FIGS. 4A-4D show SEM images of the microstructure of KGP-0.5 wt %-PAN. The darker phase represents the PAN fibers. FIGS. 4A-4B show microstructure. FIGS. 4C-4D show individual fibers in the matrix.

FIGS. 5A-5D show SEM images of the microstructure of KGP-1.0 wt %-PAN. The darker phase represents the PAN fibers. FIGS. 5A-5B show microstructure. FIGS. 5C-5D show individual fibers in the matrix.

FIGS. 14A-14F show indentation modulus and indentation hardness of electrospun PAN-reinforced geopolymer: the PAN fibers are collected in water.

DETAILED DESCRIPTION

Figure 2:
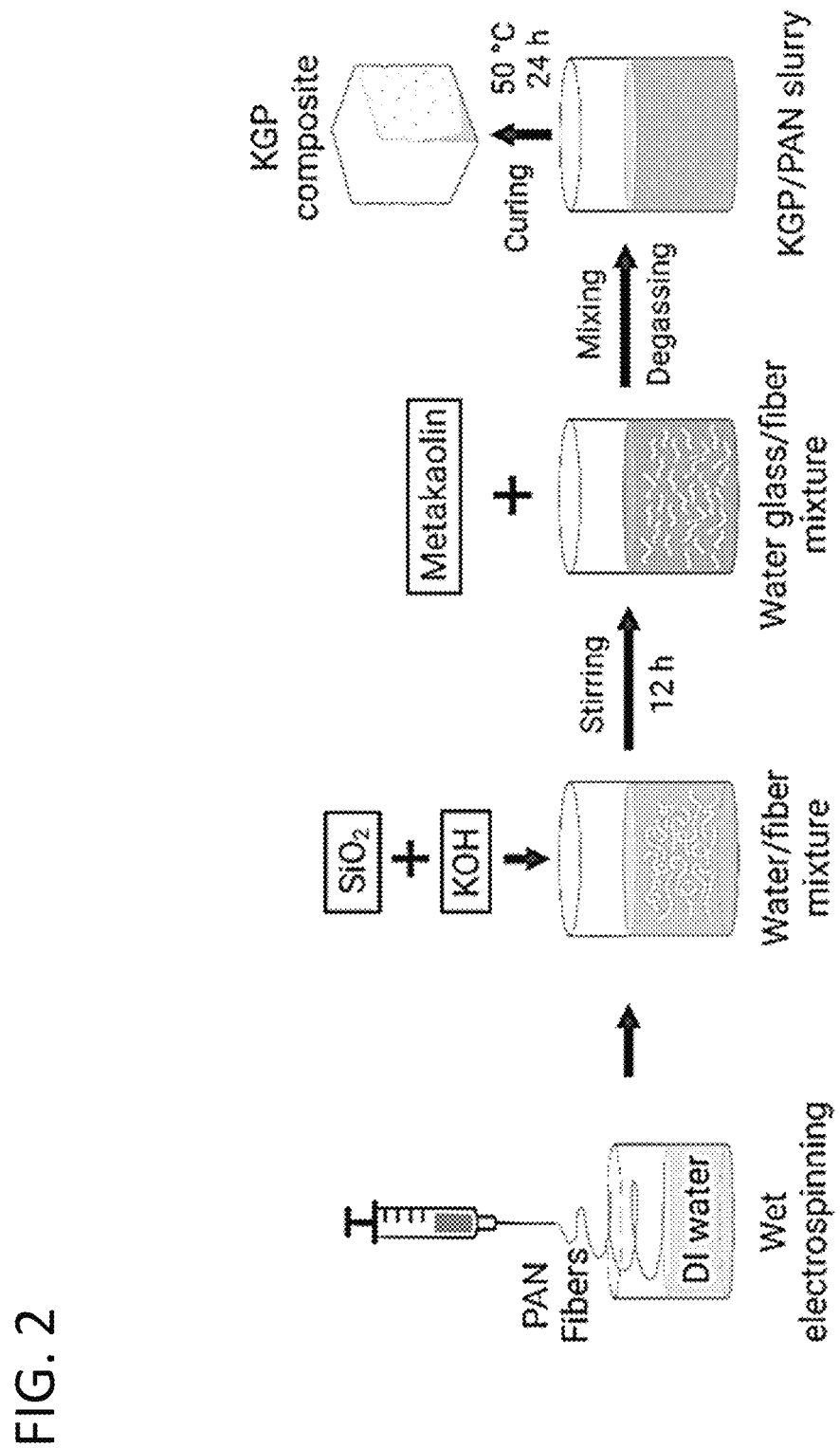
FIG. 2 shows a schematic of a procedure for the synthesis of a geopolymer ceramic using DI water as a liquid bath collector.

Methods for the production of ceramic composites in which three-dimensional (3D) printed organic polymer fibers are embedded in an amorphous inorganic or organic matrix are provided. The composites are made by electrospinning the organic polymer fibers in a liquid or gel collector. Ceramic precursors that are added to the liquid collector after the fibers are collected, or that are present in the gel collector during the electrospinning, are then cured to form a solid ceramic matrix around the organic polymer fibers to produce an organic polymer fiber-reinforced ceramic.

Two schemes for carrying out the methods are illustrated in FIG. 1A and FIG. 1B. In the scheme of FIG. 1A, the electrospun fibers are extruded from an extrusion orifice external to the collector. This process is referred to as wet-electrospinning. In the scheme of FIG. 1B, the electrospun fibers are extruded from an extrusion orifice that is immersed in the collector bath, such that the organic polymer fibers are formed in situ inside the liquid or gel of the collector. This process is referred to as Immersed Electro-Hydrodynamic Direct-Writing Method (I-EHD).

Using the methods described herein, organic polymer fibers having nano- or micron-scale diameters, micron-scale lengths, and high aspect ratios can be highly and uniformly dispersed in a polymer-derived ceramic matrix. As used herein, the term polymer-derived ceramic refers to an inorganic, non-metallic solid that forms through the thermochemical conversion (e.g., pyrolysis) of polymeric precursors. Polymer-derived ceramics include inorganic oxides, nitrides, borides, and carbides. Geopolymers are examples of polymer-derived ceramics that can form the matrices in the organic polymer-reinforced composites described herein.

Ceramic composites, including geopolymer ceramic composites, made using these methods can have high organic polymer loadings and exceptional mechanical properties. For example, various embodiments of the polymer-fiber reinforced geopolymer ceramics, including polyacrylonitrile fiber-reinforced geopolymer ceramics, have organic polymer fiber loadings in the range from 0.1 wt. % to 1.5 wt. %, per mass of the geopolymer ceramic.

The architecture of the organic polymer fibers within the ceramic composites gives rise to toughening mechanisms: upon loading, the organic polymer fibers will uncoil, stretch, and rotate, thereby absorbing and dissipating mechanical energy. As a result, the organic fiber-reinforced ceramics demonstrate improved mechanical properties relative to their non-reinforced counterparts. These improvements may be evidenced by one or more of the following: increased hardness; increased elastic response; higher fracture toughness; lower micro-porosity; and/or lower densities.

The ceramic composites have uses in a variety of applications—particularly where tough and lightweight materials are advantageous. For example, ceramic composites made with a geopolymer ceramic can be used in cements and concrete for buildings and infrastructure construction and in aerospace and automotive components, such as gears and engine transmission parts.

The selection of the liquid or gel for the collector bath will depend, at least in part, on the water solubility of the polymer from which the organic fibers are made. If the polymer is water-soluble, the collector bath can be water-based. A water-based bath can consist only of water, which may optionally be deionized, or may be an aqueous solution in which water is the solvent—provided that the solutes do not render the polymer soluble in the aqueous solution. Alternatively, if the polymer is water-insoluble, the collector bath may comprise a gel in which the polymer does not dissolve. Gels are colloidal systems in which a liquid phase is dispersed in a solid dispersing phase. The gels used as collectors in the wet-electrospinning and I-EHD methods may be viscous and/or have solid-like properties, but are sufficiently low viscosity to allow for the dispersion of the electrospun polymer fibers therein. Waterglass, which is a gel in which water is dispersed in a sodium silicate and/or a potassium silicate phase, is an example of a gel that can be used as a collector. It should be noted that water-soluble polymer fibers can also be electrospun using a gel as the collector.

For the purposes of this disclosure, an organic polymer fiber can be considered insoluble in a liquid, such as water, or in a gel, such as waterglass, provided that the fiber does not dissolve on the time-scale and under the conditions of the ceramic composite forming process (e.g., electrospinning, gel-formation, and curing). Examples of water-insoluble polymers include polymers having a solubility in water at 23° C. of less than 0.1 g/L. By way of illustration, polyacrylonitrile (PAN), polyvinyl formal (PVF) (polyvinyl formal), polycaprolactone (PCL), and polyurethances (PU) are examples of water-insoluble polymers from which the electrospun organic polymer fibers can be made. Examples of water-soluble polymers from which the electrospun organic polymer fibers can be made include polyacrylamide (PAM) and poly(methacrylic acid) (PMAA). In some examples of the ceramic composites—including the geopolymer-based ceramic composites—a water-soluble polymer other than polyethylene oxide is used.

Wet-Electrospinning.

In wet-electrospinning (FIG. 1A), a polymer solution 102 or polymer melt is extruded ("printed") through an orifice under the influence of a high voltage electric field. In illustrative embodiment of the wet-electrospinning method of FIG. 1A, polymer solution 102 is contained in a syringe 104 and the opening at the tip of the needle 105 of the syringe provides the extrusion orifice 106. As shown in FIG. 1A, the high voltage electric field may be generated by connecting the needle to a high voltage source 107 and grounding a counter electrode 109 in contact with the collector 110.

As polymer solution 102 or melt exits orifice 106, the polymer solidifies into a long polymer fiber 108 having a diameter that is typically smaller than the diameter of the orifice. By way of illustration, electrospun polymer fibers having fiber diameters of 500 µm or smaller, 250 µm or smaller, and 100 µm or smaller, including fibers with fiber diameters in the range from 1 µm to 500 µm, including the range from 10 µm to 100 µm, can be formed. However, fibers having diameters outside of these ranges can also be used. The thin electrospun organic polymer fibers are typically characterized by long lengths and high aspect ratios, which they can retain even in the final ceramic composite. By way of illustration, the electrospun organic polymer fibers can have lengths of 10 mm or greater, 100 mm or greater, and even 1 m can be used.

Solidified polymer fiber 108 is collected by the liquid or gel collector 110. This can be accomplished by positioning extrusion orifice 106 above collector 110 and letting the electrospun polymer fiber 108 descend into the liquid as it grows. (Although the wet-electrospinning process of FIG. 1A shows a single electrospun fiber being collected by a liquid bath, more than one electrospun fiber can be collected and, ultimately, incorporated into the ceramic composite.)

Ceramic precursors are added to the collector bath to form a gel. The term "ceramic precursor" refers to a chemical species (e.g., elements, compounds, or molecules) that are able to undergo reactions to form a solid ceramic during the curing step of the methods described herein. The ceramic precursors may be added to a collector after the electrospun fiber is dispersed in a liquid collector to form a gel. Alternatively, ceramic precursor may be added to a liquid collector bath prior to the collection of the electrospun fibers—in which case the collector takes the form of a gel into which the electrospun fibers are collected.

Inorganic curing agents are then added to the collector to induce the curing of the inorganic ceramic precursors. As used herein, the term curing refers to a process in which the inorganic curing agent reacts with the inorganic ceramic precursors to form a three-dimensional network of covalent bonds. The product of curing is a solid ceramic matrix in which the organic polymer fibers are dispersed. Depending upon the particular inorganic curing agents being used, the curing step may be aided by heating and/or mixing.

Sodium silicates, potassium silicates, or a mixture thereof can be used as ceramic precursors for the formation of a geopolymer ceramic because sodium silicates and potassium silicates can react with metakaolin to form a geopolymer, as discussed in more detail below and demonstrated in Example 1 and Example 2. The sodium and potassium silicates may be formed in a liquid bath, such as a water bath, by combining silica ($SiO_2$) with potassium hydroxide, sodium hydroxide, or both, and mixing for a time sufficient for the potassium silicates and/or sodium silicates to form. Fumed silica may be used. The alkali hydroxide (i.e., potassium hydroxide and/or sodium hydroxide) and the silica can be added sequentially or simultaneously. The resulting aqueous gel of potassium silicates, sodium silicates, or potassium and sodium silicates is referred to as waterglass. The dissolution of the alkali hydroxides and the silica can be aided by agitating the solution. This can be accomplished by stirring, shaking, sonication, or a combination thereof. For example, an orbital shaker can be used to provide a continuous centrifugal motion, or a magnetic stir bar can be used to provide vigorous mixing. The solution is desirably agitated until full dissolution of the alkali hydroxide and silica has been achieved and a gel has formed. The duration required for full dissolution will depend on the effectiveness of the mixing.

Metakaolin can be used as an inorganic curing agent for the formation of a geopolymer ceramic because metakaolin can react with sodium silicates and/or potassium silicates in waterglass to form a three-dimensional network of covalent bonds. When metakaolin is added to a waterglass gel containing the organic polymer fibers, it undergoes curing reactions with the alkali silicates to form the metakaolin-based geopolymer. Metakaolin is an aluminosilicate that can be formed by the calcination of kaolin at high temperatures (e.g., 650° C. to 800° C.). It is available as a high-purity, homogeneous synthetic material. Metakaolin is composed primarily of silica ($SiO_2$) and aluminum oxide ($Al_2O_3$), with variable contents of other oxides that are present in small amounts (e.g., less than about 10 wt. % and, more commonly, less than about 5 wt. %). These other oxides may include, for example, $Fe_2O_3$, $TiO_2$, MgO, CaO, $Na_2O$, and $K_2O$. Typically, metakaolin has a silica content in the range from about 40 wt. % to about 80 wt. % (including from about 45 wt. % to about 75 wt. %) and an aluminum oxide content in the range from about 10 wt. % to about 50 wt. % (including from about 15 wt. % to about 45 wt. %), with any balance being composed of other oxides and/or other impurities.

A slurry of the metakaolin and waterglass may be formed via continuous mixing, followed by degassing under vacuum to defoam the resulting mixture to remove air. The slurry can then be cast as a film or as a layer or three-dimensional object with the use of a mold and then cured to form the organic polymer-reinforced geopolymer ceramic. Depending on the particular make-up of the waterglass and the metakaolin, the stoichiometry of the geopolymer may vary. Curing can be aided by heating and continuous agitation of the slurry in an orbital shaker to remove air bubbles. Typical curing temperatures are in the range from about 30° C. to about 100° C., and typical curing times are in the range from about 12 hours to 5 days. However, temperatures and durations outside of these ranges can be used.

Immersed Electro-Hydrodynamic Direct-Writing Method (I-EHD)

As in wet-electrospinning, in I-EHD (FIG. 1B), a polymer solution or polymer melt is extruded through an orifice under the influence of a high voltage electric field. However, in the case of I-EHD, the extrusion orifice 206 is immersed in the liquid or gel collector 210. In the illustrative embodiment of the I-EHD method of FIG. 1B, the polymer solution is supplied to a needle 112 through a pump 114 and the opening at the tip of the needle provides extrusion orifice 206. As shown in FIG. 1B, the high voltage electric field may be generated by connecting the needle to a high voltage source and grounding a counter electrode in contact with the collector bath.

As the polymer solution or melt exits orifice 206 directly into collector bath 210, the polymer solidifies into a polymer fiber 208 in situ. The fiber diameter is typically smaller than the diameter of the orifice. By way of illustration, electrospun polymer fibers having fiber diameters of 500 µm or smaller, 250 µm or smaller, and 100 µm or smaller, including fibers with fiber diameters in the range from 10 µm to 500 µm, can be formed. However, fibers having diameters outside of these ranges can also be formed. As in the case of wet-electrospun fibers, the fibers formed via I-EHD are typically characterized by long lengths and high aspect ratios, which they can retain even in the final ceramic composite, and multiple fibers can be electrospun in situ within a liquid or gel bath.

The organic polymer fibers may be water-soluble or water-insoluble, as discussed above with respect to wet-electrospinning, and the nature of the liquid or gel collector bath can be selected based on the water solubility properties of the fibers.

I-EHD can be carried out using inorganic ceramic precursors and inorganic curing agents to form an inorganic ceramic composite. Ceramic precursors, as described above with respect to wet-electrospinning, are included in the collector bath to form a gel. The ceramic precursors may be added to a liquid collector after the electrospun fiber is formed in the liquid collector to form a gel. Alternatively, ceramic precursor may be added to the liquid collector prior to the formation of the electrospun fibers—in which case the collector bath takes the form of a gel into which the electrospun fibers are extruded. Inorganic curing agents, as described above with respect to wet-electrospinning, are then added to the gel to induce the curing of the inorganic ceramic precursors.

Alternatively, I-EHD can be carried out using organic polymer precursors and organic crosslinking agents to form an organic polymer composite in which the electrospun fibers are dispersed in an organic polymer matrix. Epoxy monomers, oligomers, and polymers are examples of organic polymer precursors that can be used as the collector bath, as illustrated in Example 3, below.

EXAMPLES

Example 1 (Prophetic): Organic Polymer Fiber-Reinforced Ceramic Using I-EHD

Non-Functionalized Gel Synthesis:

The raw materials are listed in Table 1 below. Fumed silica is provided by Cabot. Potassium hydroxide 87% is provided by Fisher Scientific. Metamax is provided by BASF.

TABLE 1

| Raw material for the inorganic gel synthesis. | | | | |
|---|---|---|---|---|
| Raw material | Deionized water | Fumed silica | Potassium hydroxide | Calcined metakaolin Metamax |
| Quantity (g) | 27.61 | 18.43 | 19.87 | 34.08 |

Using a stirring plate with a magnetic stirrer, dissolve potassium hydroxide in deionized water. Use an ice bath to prevent overheating. Use stirring speeds of 400-600 rpm. Dissolution should occur within 10-15 min.

Increase the stirring speed to 800 rpm. Add fumed silica into small increments until full dissolution. At the end of this step, a potassium silicate gel is formed.

Mix the potassium silicate gel with calcined metakaolin using a centrifugal mixer Thinky ARE 350. Use the following parameters for the centrifugal mixer: mixing for 3 min at 1,400 rpm and degassing for 3 min at 1,600 rpm.

3-D Printing of Electrospun Organic Fibers:

Polycaprolactone (PCL, CAPA 6400, Perstorp Ltd., Warrington, Cheshire, UK), with a molecular weight of 50,000 and a melting point of 58° C. is chosen as the stock material for its high thermal stability and good biological properties. A plastic syringe fitted with a metallic needle (gauge 30, inner diameter of 159 μm, and outer diameter of 311 μm) is loaded with PCL beads. A proportional-integral-derivative (PID)-regulated electrical heating system is adopted to melt the beads to get the polymer melt. Then, a precision syringe pump (Harvard Apparatus, Remote Infuse/Withdraw PHD Ultra Syringe Pump) is used to control the dispensing of molten polymer. Silicon wafers are used as the collector and mounted on a programmable X-Y stages (ALIO Industries, Inc.). Two pairs of auxiliary electrodes made of copper sheets (termed as AE-1, AE-2, AE-3, and AE-4) are fixed around the nozzle. They are not in contact with the motion stage or interfering with its motion. The constant voltage applied to the nozzle is supplied by a high-voltage source (Stanford Research System, Inc.), while the four-channel dynamic signals applied to the side electrodes are generated by a multifunctional data acquisition device (USB-6363, National Instruments, Inc.) and amplified through high-power-voltage amplifiers (PZD 350, TREK, Inc.). The electrospun PCL fibers are injected into the inorganic gel until up to 40 g of PC1 is deposited.

Curing of the Resulting Inorganic-Organic Composite:

The resulting inorganic-organic composite is cured in an orbital shaker at 22° C. for 48 hours at a speed of 200 rpm.

Example 2: Organic Polymer Fiber-Reinforced Geopolymer Via Wet-Electrospinning This example illustrates the integration of electrospun nanofibers into a geopolymer matrix, an environmentally friendly ceramic, using wet electrospinning.

Two different liquid bath collectors were employed, namely, deionized water (DI water) and waterglass, during wet electrospinning for integrating polymer nanofibers into ceramic matrix. In the case of using DI water as the liquid bath collector, Polyacrylonitrile (PAN) was selected as the polymer fiber material and tried three different weight fraction of fiber reinforcement in the geopolymer composites: 0.1 wt %, 0.5 wt %, and 1 wt %. In the case of using waterglass, which is the ceramic precursor gel in the synthesis process of geopolymer, as the liquid bath collector, the polymer solute used as the fiber material was varied.

FIG. 1A displays the schematic of the electrospinning setup used in the experiments described in this example. Two different liquid bath collectors were used to investigate the viability of using wet electrospinning in fabricating geopolymer nanocomposites with uniformly dispersed electrospun fibers.

The synthesis procedure of the geopolymer nanocomposites when using DI water as the liquid bath collector in wet electrospinning is shown in FIG. 2. This procedure was designed for water-insoluble polymer fiber reinforcement. PAN was used in this case. First, DI water was used to collect the PAN fibers during wet electrospinning. Second, the water/fiber mixture was mixed with potassium hydroxide pellets and fumed silica and stirred for 12 h to form the waterglass with uniformly dispersed PAN fibers in it. Afterward, the waterglass and fiber mixture were combined with synthetic metakaolin to produce the fresh potassium geopolymer (KGP)/PAN composite slurry. The slurry was then cured at 50° C. for 24 h to form the hardened geopolymer nanocomposite samples.

Using Deionized Water as a Liquid Collector.

Electrospun PAN fiber-reinforced geopolymer composites were fabricated in three different weight ratios of fibers: 0.1 wt %, 0.5 wt %, and 1 wt %, respectively. The electrospinning parameters including solution parameters and process parameters are summarized in Table 2 and kept the same for all three scenarios. The needle used in the electrospinning experiments was a metallic needle with an inner diameter of 203 μm (gauge 27).

TABLE 2

Electrospinning parameters of using DI water as the liquid bath collector in the synthesis of KGP/PAN nanocomposite.

| Solution Parameters | Polymer solute PAN ($M_w$ = 150,000) | Solvent Dimethylformamide (DMF) | Polymer concentration 14 wt % |
|---|---|---|---|
| Process Parameters | Applied voltage 8 kV | Needle-to-ground distance 8 cm | Flow rate 1 ml/h |

KGP-0.1 wt %-PAN

To fabricate 60 g of geopolymer composite with 0.1 wt % of electrospun PAN fibers, the weight of each raw material used in the synthesis is listed in Table 3. The weight of the PAN/DMF solution was calculated based on the PAN fiber weight needed, i.e., 0.06 g, and the polymer concentration of the PAN/DMF solution, i.e., 14 wt %. Water evaporation was considered by adding any weight loss of the DI water after the electrospinning experiment. FIGS. 3A-3D show the SEM images of the microstructure of the hardened composite sample.

TABLE 3

Weight of raw materials used in the synthesis of KGP-0.1 wt %-PAN.

| DI water | KOH | $SiO_2$ | Metakaolin | PAN fibers | PAN/DMF solution |
|---|---|---|---|---|---|
| 16.55 g | 11.91 g | 11.05 g | 20.43 g | 0.06 g | 0.43 g |

KGP-0.5 wt %-PAN

To fabricate 60 g of geopolymer composite with 0.5 wt % of electrospun PAN fibers, the weight of each raw material used in the synthesis is listed in Table 4. The microstructure of the sample is shown in FIGS. 4A-4D.

TABLE 4

Weight of raw materials used in the synthesis of KGP-0.5 wt %-PAN.

| DI water | KOH | $SiO_2$ | Metakaolin | PAN fibers | PAN/DMF solution |
|---|---|---|---|---|---|
| 16.48 g | 11.86 g | 11 g | 20.35 g | 0.3 g | 2.14 g |

KGP-1.0 wt %-PAN

To fabricate 60 g of geopolymer composite with 1.0 wt % of electrospun PAN fibers, the weight of each raw material used in the synthesis is listed in Table 5. The microstructure of the sample is shown in FIGS. 5A-5D.

TABLE 5

Weight of raw materials used in the synthesis of KGP-1.0 wt %-PAN.

| DI water | KOH | $SiO_2$ | Metakaolin | PAN fibers | PAN/DMF solution |
|---|---|---|---|---|---|
| 16.40 g | 11.80 g | 10.98 g | 20.24 g | 0.6 g | 4.29 g |

Using Waterglass as a Collector.

Figure 6:
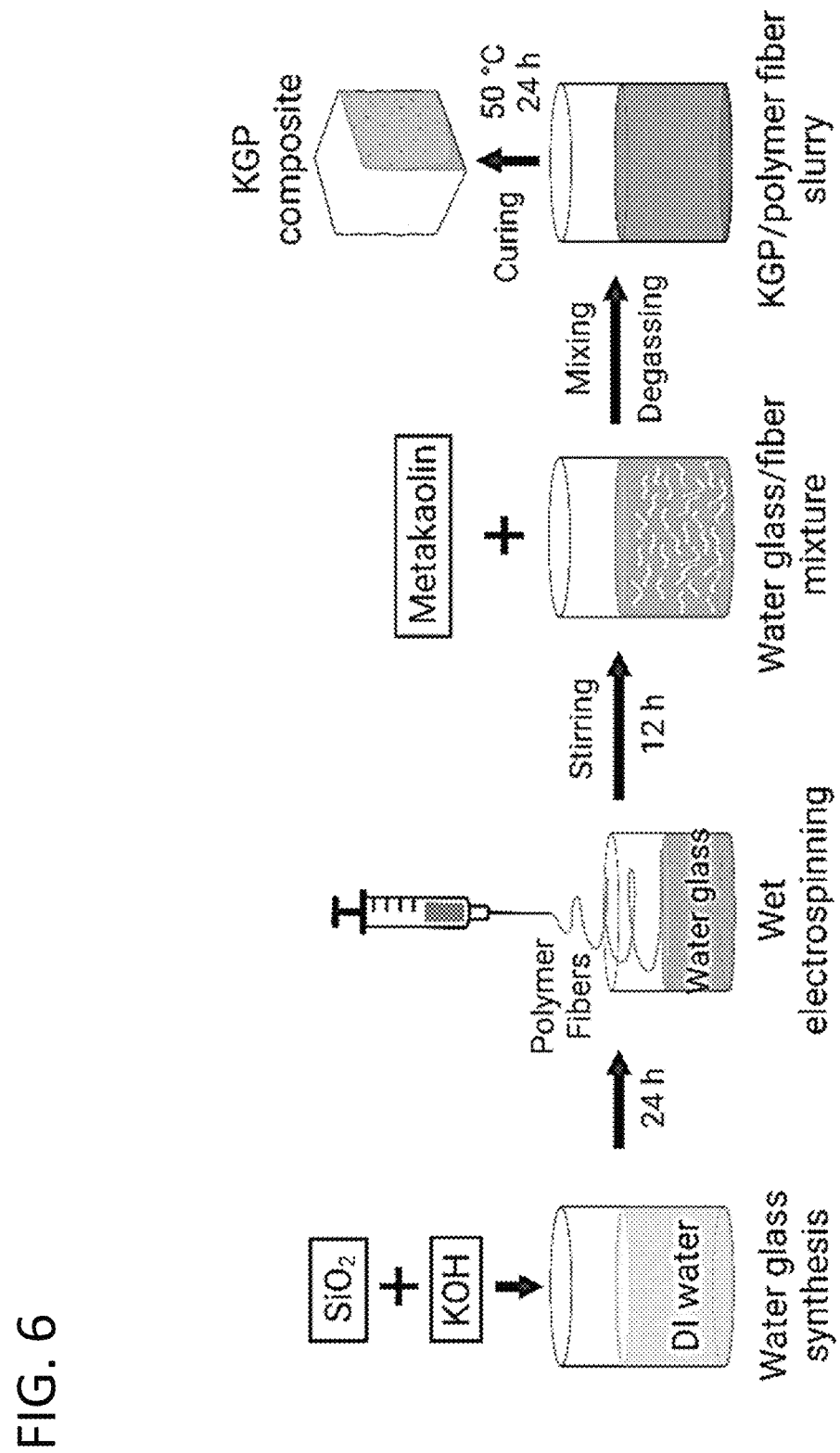
FIG. 6 shows a schematic of a procedure for the synthesis of a geopolymer ceramic using waterglass as a liquid bath collector.

The synthesis procedure of the geopolymer nanocomposites when using the waterglass as the liquid bath collector in wet electrospinning is shown in FIG. 6. This procedure can be applied regardless of the water solubility of the polymer fiber reinforcement. The feasibility of employing this procedure in fabricating geopolymer nanocomposites reinforced with PAN (water-insoluble) was verified. First, the waterglass gel was synthesized by mixing DI water, potassium hydroxide pellets, and fumed silica together using a magnetic stirrer and was aged for 24 h to form a homogenous waterglass gel. The waterglass gel was then adopted as the liquid bath collector during wet electrospinning for collecting PAN electrospun fibers. After collection, the waterglass/fiber mixture was stirred for 12 h to obtain uniform fiber dispersion inside the waterglass. Afterward, the mixture was combined with synthetic metakaolin to produce the fresh KGP/PAN slurry. The slurry was then cured at 50° C. for 24 h to form the hardened geopolymer nanocomposite samples.

The weight fraction of the fiber reinforcement was selected as 0.5 wt %. The electrospinning process parameters were varied to optimize the generation of continuous fibers. The needle used in the electrospinning experiments was a metallic needle with an inner diameter of 584 μm (gauge 21).

KGP-0.5 wt %-PAN

Figures 7A, 7B:
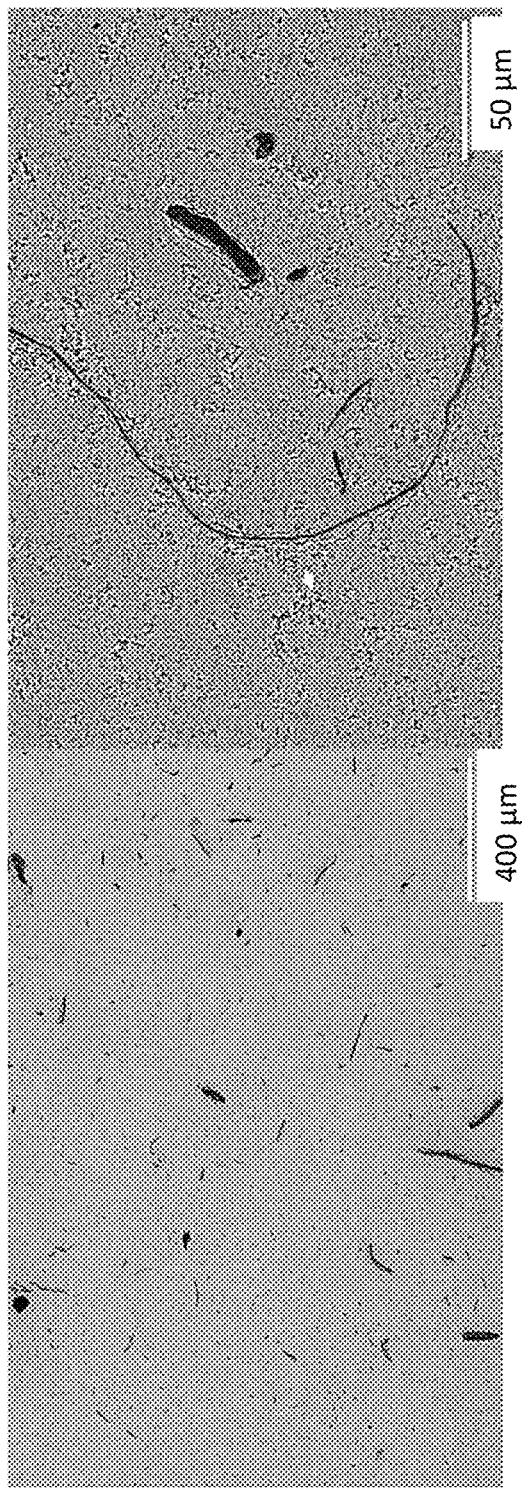
FIG. 7A shows microstructure of KGP-0.5 wt %-PAN produced using waterglass as the liquid bath collector.
FIG. 7B shows individual PAN fibers in the matrix.
Figure 8A:
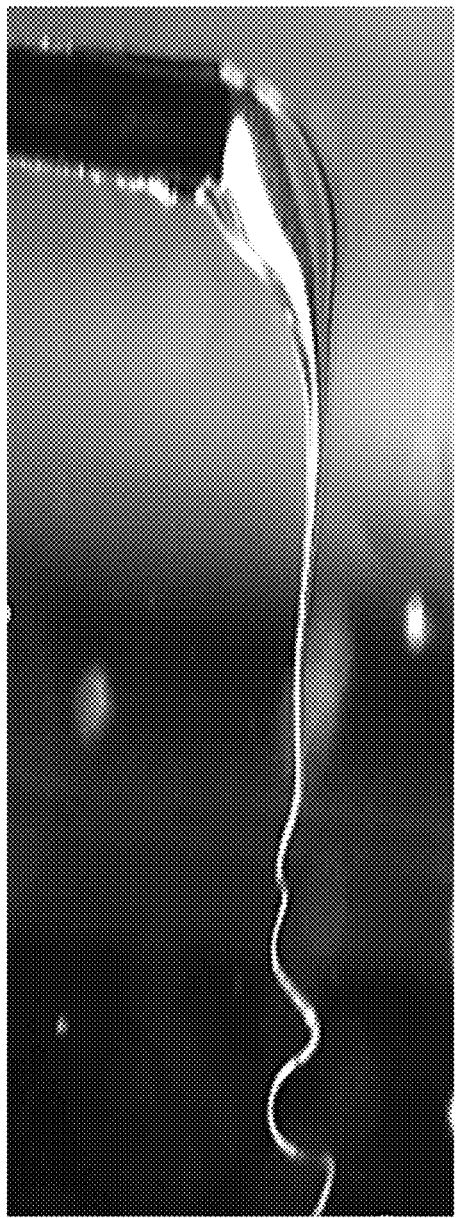
FIGS. 8A-8B show microscopic images of a polyethylene oxide (PEO) fiber being electrospun directly in an epoxy collector bath in an I-EHD process that used a 10 wt % PEO solution.
Figure 8B:
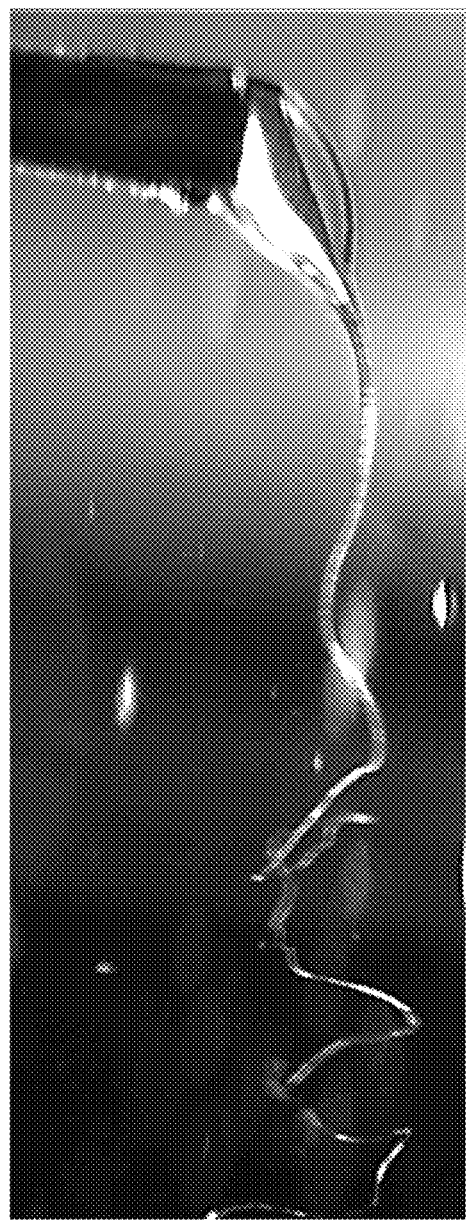
Figure 9A:
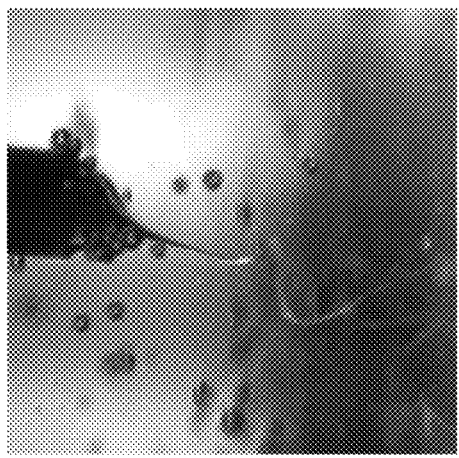
FIGS. 9A-9D show microscopic images of the near-field I-EHD process.
Figure 9B:
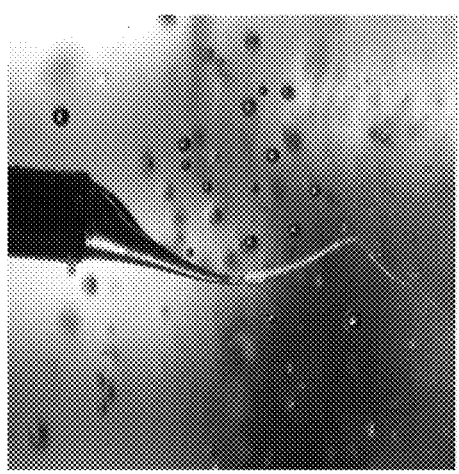
Figure 9C:
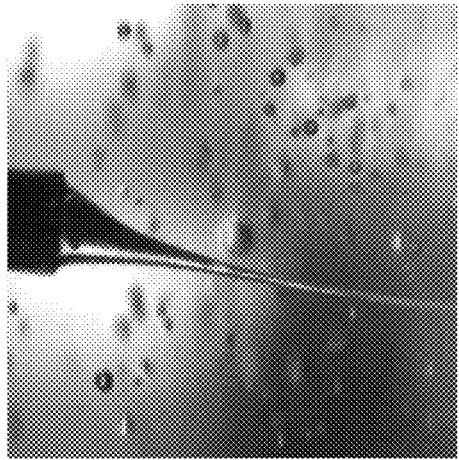
Figure 9D:
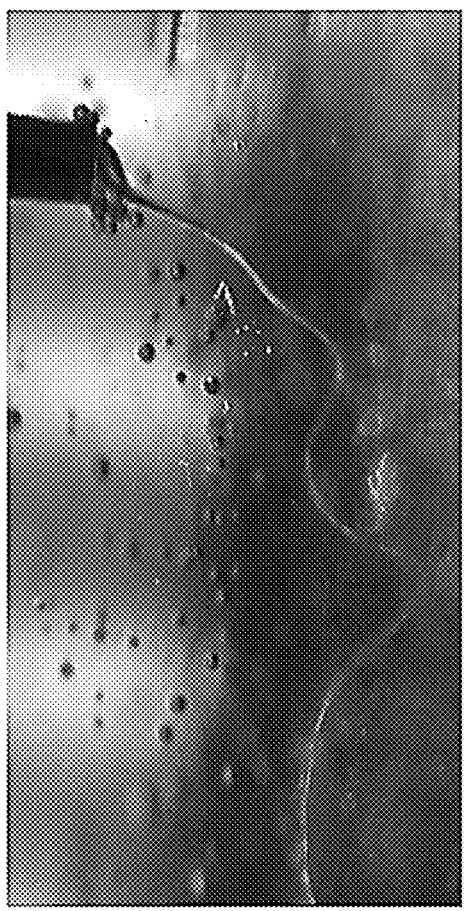

The solution and process parameters used in wet electrospinning PAN fibers into the waterglass are listed in Table 6. The weight of raw materials used in the synthesis was the same as in Table 4. The SEM images of the microstructure of the hardened sample are shown in FIGS. 7A-7B.

TABLE 6

Electrospinning parameters of wet electrospinning PAN fibers into the waterglass.

| Solution Parameters | Polymer solute PAN $M_w$ = 150,000) | Solvent DMF | Polymer concentration 14 wt % |
|---|---|---|---|
| Process Parameters | Applied voltage 10 kV | Needle-to-ground distance 10 cm | Flow rate 1 ml/h |

Example 3: Organic Polymer Fiber-Reinforced Epoxy Polymer

This example illustrates the use of Immersed Electrohydrodynamic Direct-Writing (I-EHD) to directly generate nanofibers in a liquid organic polymer bath to yield nanofiber-reinforced ceramic composites. I-EHD utilizes a high electric static force to eject nano-scale fibers from a micro-nozzle within a liquid bath (or immersed electrospinning). The schematic of this process is shown in FIG. 1B. The biggest difference between I-EHD and wet electrospinning is that the needle is immersed in the liquid bath.

In this example, the electrospinning process was initiated inside an epoxy resin bath. The different material combinations used for exploring the I-EHD process are presented below. For each experiment, the electrospinning process parameters were altered to achieve the optimized performance of the polymer jet.

10 wt % PEO/DI Water Solution

The I-EHD method was conducted with 10 wt % PEO solution. Two experiments were conducted using different electrospinning parameters, listed in Table 7 and Table 8, respectively, and the results are shown in FIGS. 8A-8B and FIGS. 9A-9D.

TABLE 7

First set of parameters used in the I-EHD experiment with 10 wt % PEO.

| Material Combination | Polymer solute PEO ($M_w$ = 600,000) | Solvent DI water | Polymer concentration 10 wt % | Liquid bath Pure epoxy (w/o hardener) |
|---|---|---|---|---|
| Process Parameters | Applied voltage 500 V | Needle-to-ground distance 15 mm | Flow rate 0 ml/h | Collector moving speed 2 mm/s |

With this material combination, electrospinning behavior could be obtained. The elongation and thinning of the polymer jet were obvious and bending instability also initiated. The speed of the polymer jet was significantly reduced compared to that in the air due to the interaction with the liquid bath.

A near-field I-EHD experiment was carried out by reducing the needle-to-ground distance to 2 mm to investigate the polymer jet behavior. It was observed that even in near-field, which means that the distance between the needle tip to the ground is less than 5 mm, the bending instability still existed, different from the near-field electrospinning in the air. The fibers did not deposit on the ground electrode due to the existence of liquid bath.

TABLE 8

Second set of parameters used in the I-EHD experiment with 10 wt % PEO.

| Material Combination | Polymer solute PEO ($M_w$ = 600,000) | Solvent DI water | Polymer concentration 10 wt % | Liquid bath Pure epoxy (w/o hardener) |
|---|---|---|---|---|
| Process Parameters | Applied voltage 450 V | Needle-to-ground distance 2 mm | Flow rate 0 ml/h | Collector moving speed 1 mm/s |

10 wt % PEO/Ethanol solution

The solvent of PEO was changed to 70% ethanol to increase the miscibility of the polymer solvent with the liquid bath, i.e., epoxy resin. This was to expedite the phase exchange between the polymer solvent and the epoxy bath to facilitate the fiber solidification.

Figure 10A:
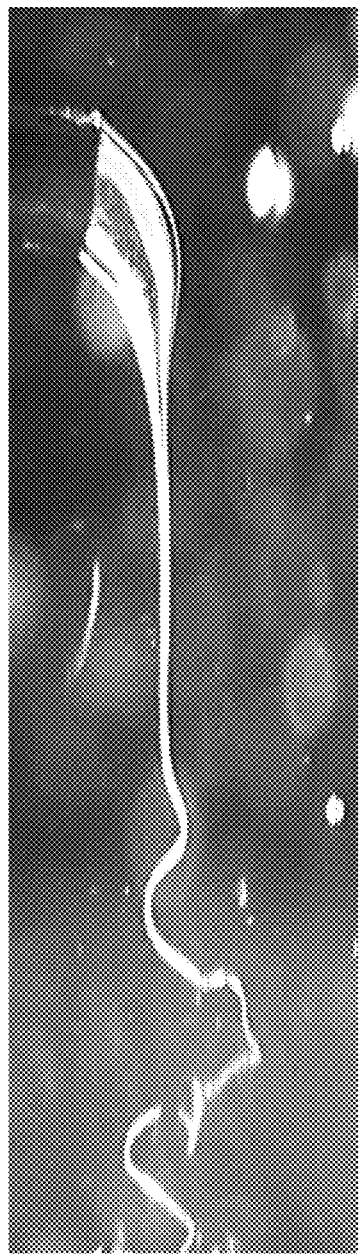
FIGS. 10A-10B show microscopic images of the electrospinning of a PEO fiber being electrospun directly in an epoxy collector bath during an I-EHD process with a 10 wt % PEO/ethanol (70%) solution.
Figure 10B:

The parameters used in the I-EHD experiment are listed in Table 9 and the results are shown in FIGS. 10A-10B. However, the behavior of the polymer jet showed no obvious difference with that of using PEO/DI water solution.

TABLE 9

Parameters of I-EHD experiment with 10 wt % PEO/Ethanol solution.

| Material Combination | Polymer solute PEO ($M_w$ = 600,000) | Solvent 70% Ethanol | Polymer concentration 10 wt % | Liquid bath Pure epoxy (w/o hardener) |
|---|---|---|---|---|
| Process Parameters | Applied voltage 400 V | Needle-to-ground distance 15 mm | Flow rate 0 ml/h | Collector moving speed 2 mm/s |

Cured Epoxy Resin with PEO Fibers

Figure 11:
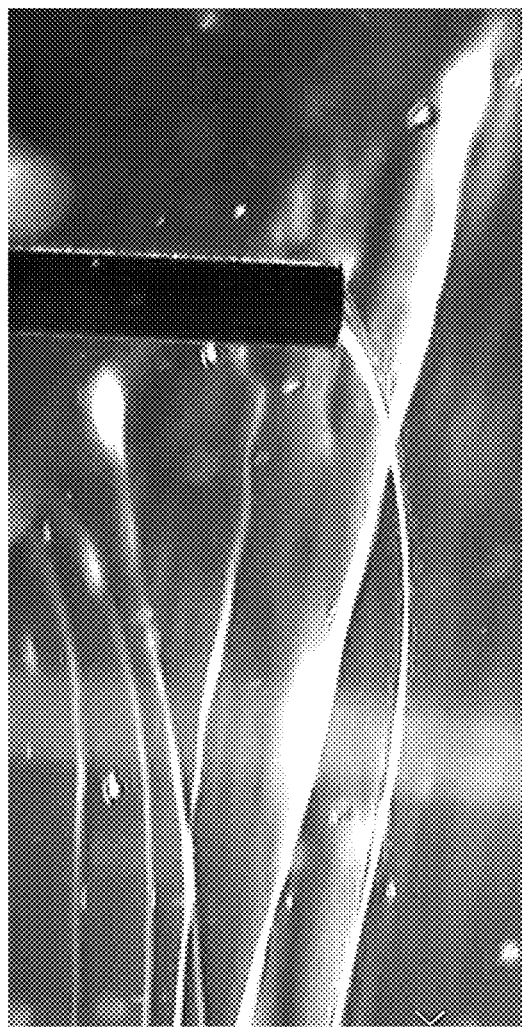
FIG. 11 shows microscopic images of the polymer fiber electrospinning during an I-EHD process in a ready-to-cure epoxy.
Figure 12A:
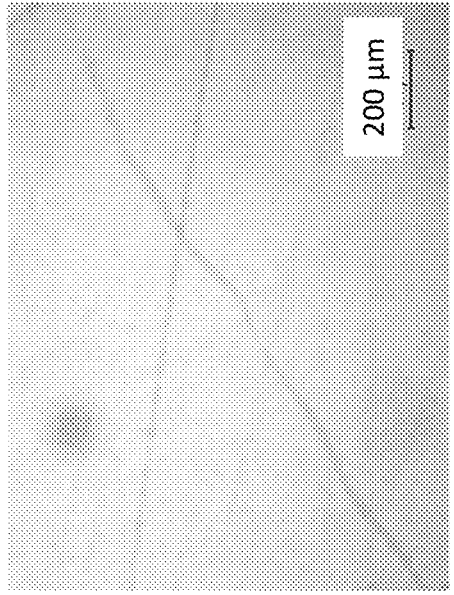
FIGS. 12A-12D show optical microscopy images of the epoxy/PEO sample showing individual PEO fibers.
Figure 12B:
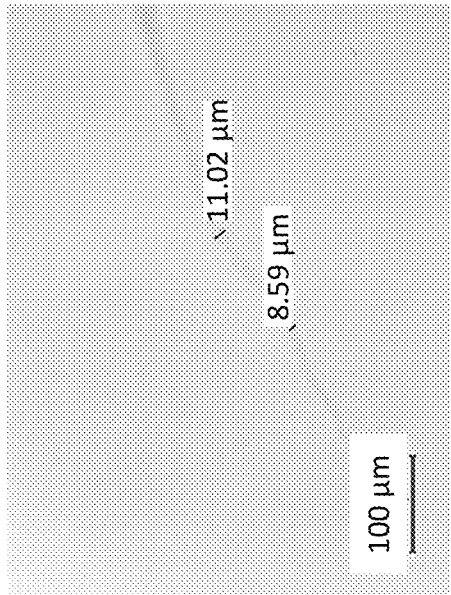
Figure 12C:
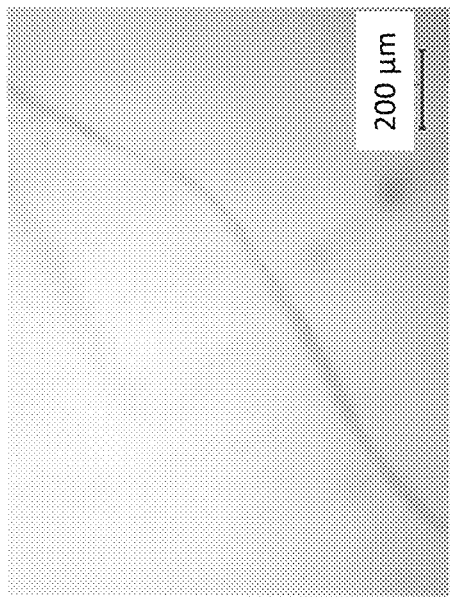
Figure 12D:
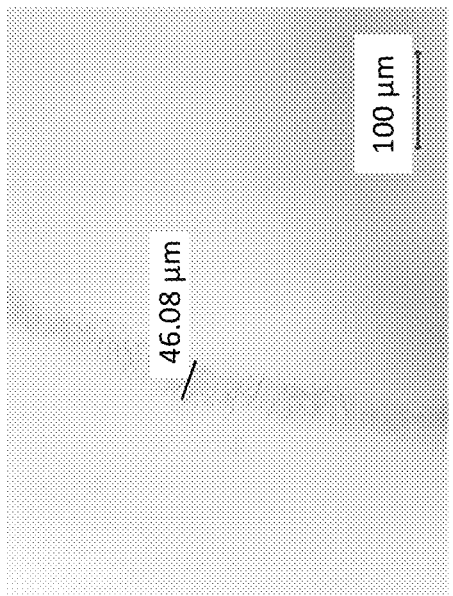
Figure 13A:
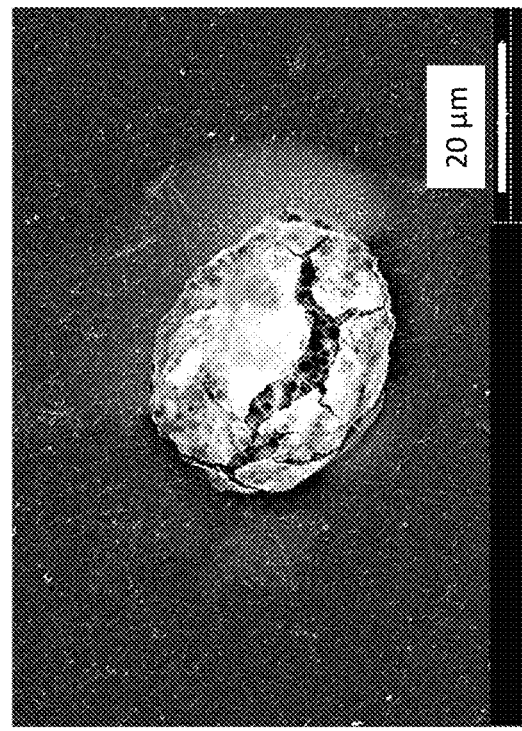
FIGS. 13A-13D show SEM images of the epoxy/PEO sample showing PEO fiber.
Figure 13B:
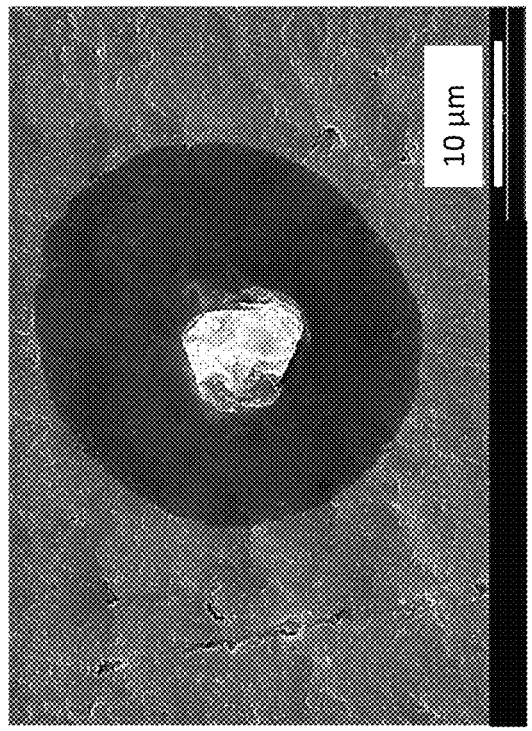
Figure 13C:
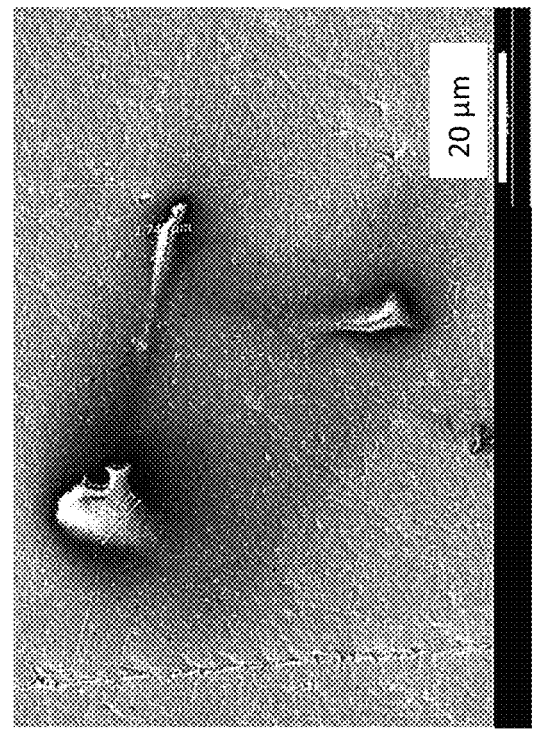
Figure 13D:
Figure 14E:
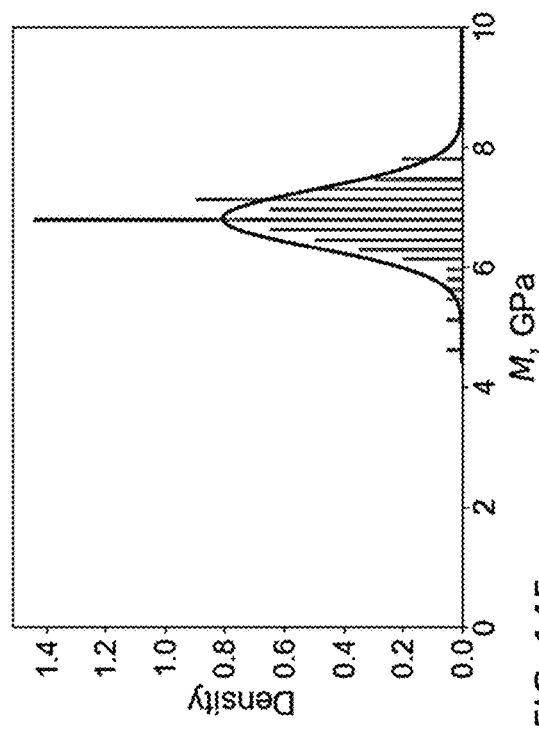
Figure 14F:
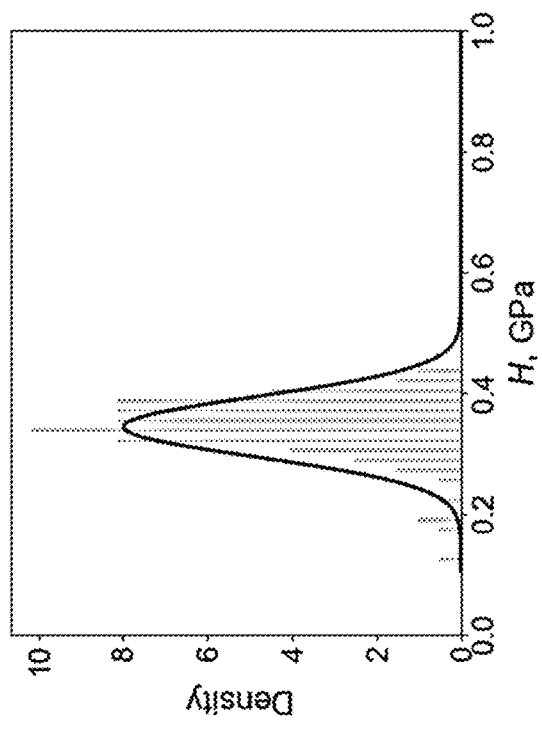
Figure 15A:
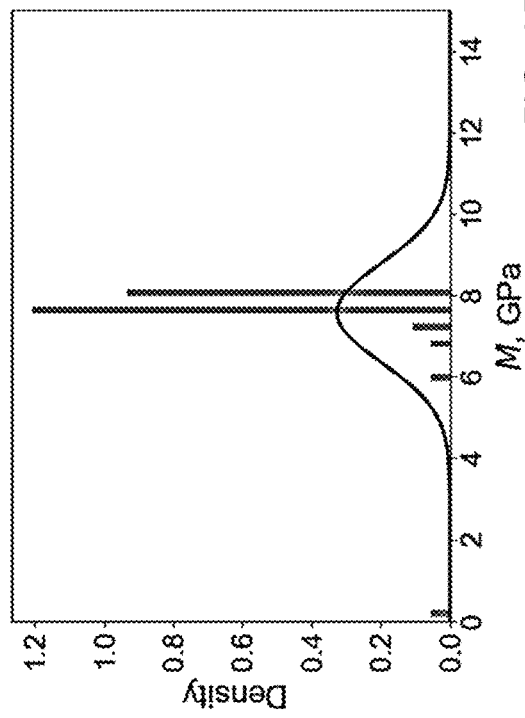
FIGS. 15A-15F show indentation modulus and indentation hardness of electrospun PAN-reinforced geopolymer: the PAN fibers are collected in waterglass.
Figure 15B:
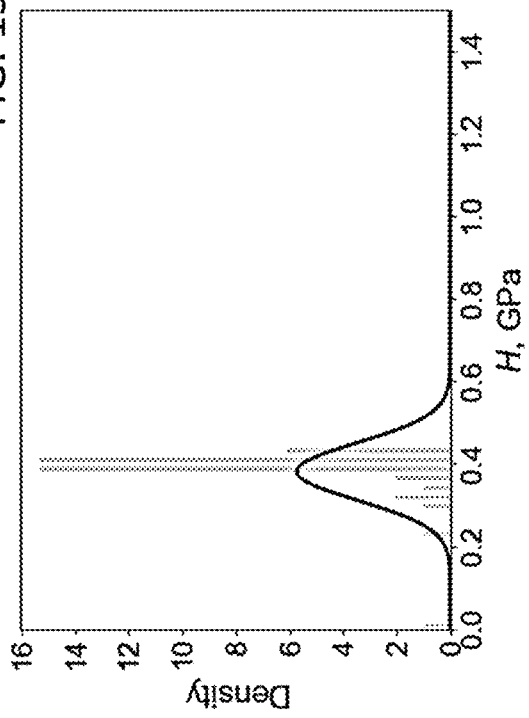
Figure 15C:
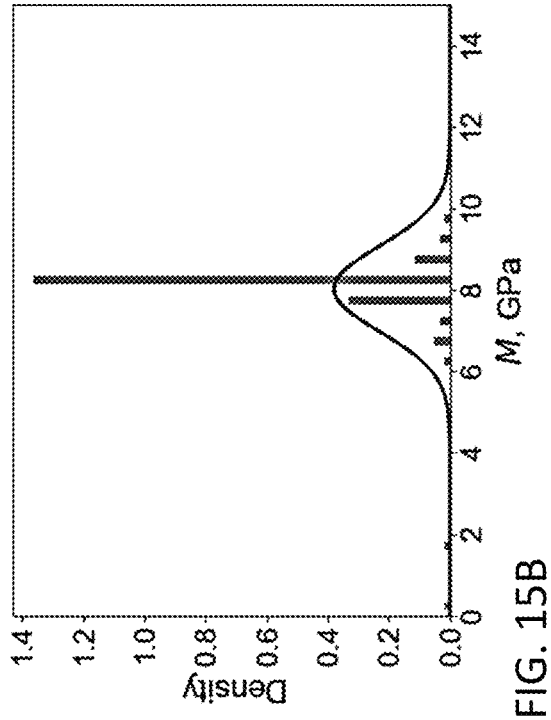
Figure 15D:
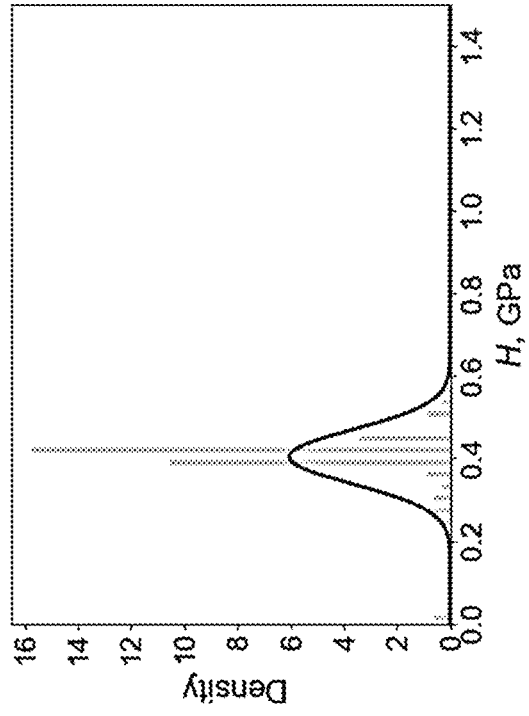
Figure 15E:
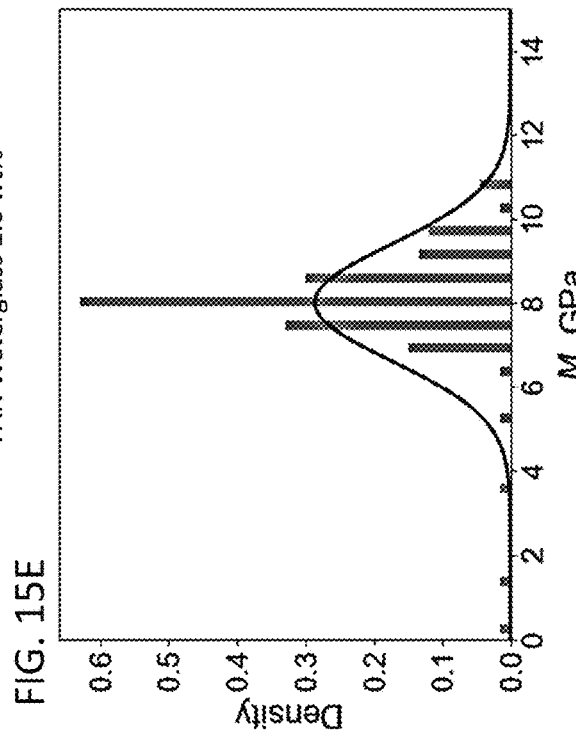
Figure 15F:
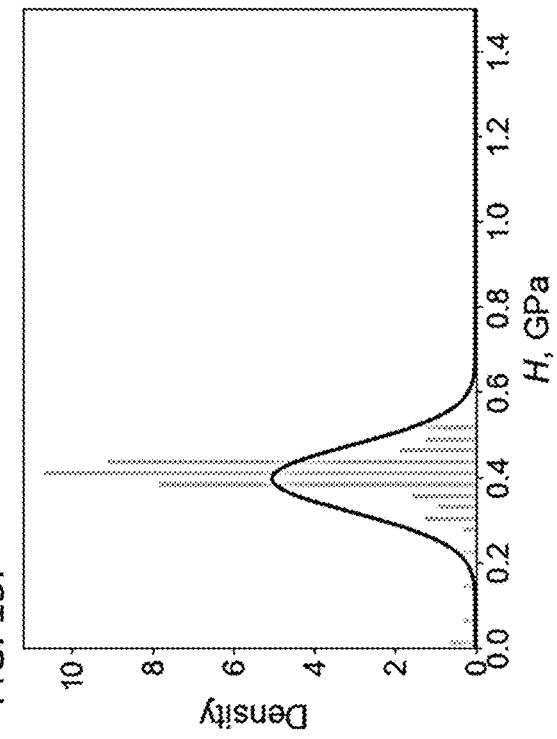

To verify the success of using the I-EHD method to generate polymer fibers directly inside a matrix, the epoxy resin was cured with PEO fibers. The experiment parameters are listed in Table 10. The epoxy resin was first mixed with the hardener. Afterward, the I-EHD experiment was performed in the ready-to-cure epoxy resin. The inner diameter of the needle was 159 μm (gauge 30). The fiber trajectory was controlled using a Labview program. The needle was following a layer-by-layer square trajectory with each side equal to 15 mm and a vertical increment of 0.2 mm between each layer. FIG. 11 shows the I-EHD process within the ready-to-cure epoxy.

TABLE 10

Parameters of I-EHD experiment for the cured epoxy/PEO sample.

| Material Combination | Polymer solute PEO ($M_w$ = 600,000) | Solvent 70% Ethanol | Polymer concentration 10 wt % | Liquid bath Epoxy resin (w/ hardener) |
|---|---|---|---|---|
| Process Parameters | Applied voltage 600 V | Needle-to-ground distance 4-20 mm | Flow rate 10 μl/h | Collector moving speed 3 mm/s |

No fiber agglomeration was observed, and the fibers seemed to be held in place where they were generated instead of depositing on the ground, which means that a controlled deposition of fibers inside a liquid bath is achievable.

The cured sample was characterized using optical microscopy and scanned electron microscopy. FIGS. 12A-12D and FIGS. 13A-13D display the optical microscopic images and SEM images of the sample showing the existence of individual PEO fibers in epoxy produced by I-EHD.

Mechanical Properties of Electrospun Fiber-Reinforced Geopolymer

Indentation Test Results

The elasto-plastic properties were measured using nanoindentation tests conducted using an Anton Paar nanohardness tester equipped with a Berkovich probe. An 11×11 series of tests was conducted, each test being characterized by a maximum load of 500 mN, a loading/unloading rate of 1000 mN/min, and a holding phase of 10 s.

FIGS. 14A-14F and FIGS. 15A-15F display the histograms of the indentation modulus and indentation hardness for electrospun PAN-reinforced geopolymer when the collector is water and then water glass. Table 11 gives the resulting values of the indentation modulus and indentation hardness.

TABLE 11

Mechanical properties of electrospun PAN-reinforced geopolymer. The collector is water and then waterglass.

| Polymer | Collector | Polymer mass fraction (wt %) | M, GPa | H, MPa | Number of tests |
|---|---|---|---|---|---|
| PAN | water | 0.1 | 8.2 ± 0.4 | 402.6 ± 38.9 | 121 |
| PAN | water | 0.5 | 6.8 ± 0.6 | 334.8 ± 53.1 | 121 |
| PAN | water | 1.0 | 6.8 ± 0.5 | 347.1 ± 50.9 | 121 |
| PAN | waterglass | 0.1 | 8.1 ± 0.8 | 410.1 ± 54.7 | 121 |
| PAN | waterglass | 0.5 | 7.8 ± 0.4 | 393.7 ± 38.2 | 45 |
| PAN | waterglass | 1.0 | 8.0 ± 1.4 | 398.5 ± 79.1 | 121 |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only on or can mean "one or more." Both embodiments are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of making a fiber-reinforced ceramic, the method comprising:
   electrospinning a water-insoluble organic polymer fiber;
   collecting the electrospun water-insoluble organic polymer fiber in a collector, wherein the collector is a liquid or gel, to disperse the electrospun water-insoluble organic polymer fiber in the collector;
   adding inorganic ceramic precursors to the collector, wherein the inorganic ceramic precursors are added to the collector before, during, or after collecting the electrospun water-insoluble organic polymer fiber in the collector;
   adding an inorganic curing agent into the collector; and
   curing the inorganic ceramic precursors and the inorganic curing agent to form an organic polymer fiber-reinforced ceramic.

2. The method of claim 1, wherein the inorganic ceramic precursors comprise potassium silicate, sodium silicate, or a mixture thereof, the inorganic curing agent comprises metakaolin, and the organic polymer fiber-reinforced ceramic is an organic polymer fiber-reinforced geopolymer.

3. The method of claim 2, wherein the organic polymer fiber-reinforced geopolymer has an electrospun water-insoluble organic polymer fiber concentration of least 0.1 weight percent, based on the weight of the geopolymer.

4. The method of claim 2, wherein the organic polymer fiber-reinforced geopolymer has an electrospun water-insoluble organic polymer fiber concentration in the range from 0.1 weight percent to 1 weight percent, based on the weight of the geopolymer.

5. The method of claim 1, wherein the water-insoluble organic polymer fiber is a polyacrylonitrile fiber.

6. The method of claim 5, wherein the inorganic ceramic precursors comprise potassium silicate, sodium silicate, or a mixture thereof, the inorganic curing agent comprises metakaolin, and the organic polymer fiber-reinforced ceramic is a polyacrylonitrile fiber-reinforced geopolymer.

7. The method of claim 1, wherein the inorganic ceramic precursors are added to the collector after the electrospun water-insoluble organic polymer fiber is dispersed in the collector.

8. The method of claim 7, wherein the collector consists of only deionized water.

9. The method of claim 7, wherein the inorganic ceramic precursors comprise potassium silicate, sodium silicate, or a mixture thereof, the inorganic curing agent comprises metakaolin, and the organic-polymer fiber-reinforced ceramic is an organic polymer fiber-reinforced geopolymer.

10. The method of claim 9, wherein the water-insoluble organic polymer fiber is a polyacrylonitrile fiber.

11. The method of claim 1, wherein the inorganic ceramic precursors are added to the collector before the electrospun water-insoluble organic polymer fiber is dispersed in the collector.

12. The method of claim 11, wherein the inorganic ceramic precursors comprise potassium silicate, sodium silicate, or a mixture thereof, the inorganic curing agent comprises metakaolin, and the organic polymer fiber-reinforced ceramic is an organic polymer fiber-reinforced geopolymer.

13. The method of claim 12, wherein the water-insoluble organic polymer fiber is a polyacrylonitrile fiber.

14. A method of making a fiber-reinforced ceramic, the method comprising:
   electrospinning a water-soluble organic polymer fiber;
   collecting the electrospun water-soluble organic polymer fiber in a gel collector comprising inorganic ceramic precursors to disperse the electrospun water-soluble organic polymer fiber in the gel collector, wherein the water-soluble organic polymer fiber is not a polyethylene oxide fiber;
   adding an inorganic curing agent into the gel collector; and
   curing the inorganic ceramic precursors and the inorganic curing agent to form an organic polymer fiber-reinforced ceramic.

15. The method of claim 14, wherein the inorganic ceramic precursors comprise potassium silicate, sodium silicate, or a mixture thereof, the inorganic curing agent comprises metakaolin, and the organic polymer fiber-reinforced ceramic is an organic polymer fiber-reinforced geopolymer.

16. The method of claim 15, wherein the water-soluble organic polymer fiber comprises polyacrylamide or poly (methacrylic acid).

17. The method of claim 15, wherein the organic polymer fiber-reinforced geopolymer has an electrospun organic polymer fiber concentration of least 0.1 weight percent, based on the weight of the geopolymer.

18. The method of claim 15, wherein the organic polymer fiber-reinforced geopolymer has an electrospun organic polymer fiber concentration in the range from 0.1 weight percent to 1 weight percent, based on the weight of the geopolymer.

* * * * *